(12) United States Patent  
Crick (10) Patent No.: US 6,733,669 B1  
(45) Date of Patent: May 11, 2004

(54) WATER FILTER BOTTLE

(76) Inventor: Bertram Valentine Crick, 979 Park Pl., Brooklyn, NY (US) 11213

( * ) Notice: Subject to any disclaimer, the term of this patent is extended or adjusted under 35 U.S.C. 154(b) by 0 days.

(21) Appl. No.: 10/348,563

(22) Filed: Jan. 20, 2003

(51) Int. Cl.⁷ ............................................. B01D 35/00
(52) U.S. Cl. ..................... 210/244; 210/282; 210/455; 210/473; 210/484
(58) Field of Search .................... 210/244, 282, 210/455, 464, 470, 473, 484

(56) References Cited

U.S. PATENT DOCUMENTS

| | | | |
|---|---|---|---|
| 703,654 A | 8/1902 | Hall ........................ 210/416.3 |
| 2,781,312 A | 2/1957 | Klumb et al. ................ 210/282 |
| 4,695,379 A | * 9/1987 | Nohren, Jr. et al. ......... 210/282 |
| 4,714,550 A | 12/1987 | Malson et al. .............. 210/244 |
| 4,800,018 A | 1/1989 | Moser ........................ 210/282 |
| 5,122,272 A | 6/1992 | Iana et al. .................. 210/473 |
| 5,186,830 A | 2/1993 | Rait ........................... 210/282 |
| 5,238,576 A | * 8/1993 | Affonso ...................... 210/282 |
| 5,431,813 A | 7/1995 | Daniels ....................... 210/282 |
| 5,562,824 A | 10/1996 | Magnusson ................. 210/282 |
| 5,609,759 A | 3/1997 | Nohren, Jr. et al. ......... 210/282 |
| 5,674,391 A | * 10/1997 | Nohren, Jr. .................. 210/282 |
| 5,733,448 A | 3/1998 | Kaura ......................... 210/244 |
| 5,830,360 A | 11/1998 | Mozayeni .................... 210/473 |
| 6,344,146 B1 | 2/2002 | Moorehead et al. ......... 210/244 |

* cited by examiner

Primary Examiner—Ivars C. Cintins  
(74) Attorney, Agent, or Firm—Michael I. Kroll (57) ABSTRACT

The present invention discloses a personal water purification system providing a watertight polymeric container 12 having a removable, threaded unfiltered water fill cap 18 that provides access through port 28 to an upper unfiltered water receiving chamber 20. At the lowest integral portion 24 of the receiving chamber 20, a threaded port 30 is provided for the attachment of a disposable filter cartridge 26 that is vertically threaded into the port 30. This allows for gravity induced filtering through cartridge 26 as opposed to pressure induced filtering. A plurality of filtered water ports 32 are also located in the lower integral portion of the unfiltered water chamber 20, one or more opposite the other and/or juxtapositioned, which allow filtered water to be dispensed from the lower filtered water chamber 16 to a drinking spout 22 provided at the top most portion of the container and to flow by gravity through a plurality of channels/conduits 34 when the container is tipped to its side.

10 Claims, 8 Drawing Sheets

WATER FILTER BOTTLE

BACKGROUND OF THE INVENTION

1. Field of the Invention

The present invention relates generally to filtering containers and, more specifically, to a personal water filtering system comprising a portable bottle having a top member and a bottom member threadedly connected having a filtering material therebetween. The top member having a first and second spout. The first spout provides means for pouring water into a first chamber which provides means for the water to gravitational pass into the second chamber through said filtering material. The water in the second chamber is in fluid communication with the second spout by means of at least one conduit contained within the top member. The filtering material can be periodically replaced by separating the two members, which provides access to the filtering material.

2. Description of the Prior Art

There are other filtering devices designed for portable containers. Typical of these is U.S. Pat. No. 703,654 issued to Hall on Jul. 1, 1902.

Another patent was issued to Klumb et al., on Feb. 12, 1957 as U.S. Pat. No. 2,781,312. Yet another U.S. Pat. No. 4,714,550 was issued to Malson et al., on Dec. 22, 1987 and still yet another was issued on Jan. 24, 1989 to Moser as U.S. Pat. No. 4,800,018.

Another patent was issued to Iana on Jun. 16, 1992 as U.S. Pat. No. 5,122,272. Yet another U.S. Pat. No. 5,186,830 was issued to Rait on Feb. 16, 1993. Another was issued to Daniels on Jul. 11, 1995 as U.S. Pat. No. 5,431,813 and still yet another was issued on Oct. 8, 1996 to Magnusson as U.S. Pat. No. 5,562,824.

Another patent was issued to Nohren, Jr. et al., on Mar. 11, 1997 as U.S. Pat. No. 5,609,759. Yet another U.S. Pat. No. 5,733,448 was issued to Kaura on Mar. 31, 1998. Another was issued to Mozayeni on Nov. 3, 1998 as U.S. Pat. No. 5,830,360 and still yet another was issued on Feb. 5, 2002 to Moorehead et al., as U.S. Pat. No. 6,344,146.

U.S. Pat. No. 703,654

Inventor: Almon Hall

Issued: Jul. 1, 1902

The invention is a canteen for hand manipulation comprising in its construction a body portion, two chambers enclosed within the cavity of the body portion, one of said chambers being for unfiltered water and the other chamber being for filtered water, a filtering body interdisposed between and in communication with said two chambers, and an air-pump connected to the chamber for unfiltered water.

U.S. Pat. No. 2,781,312

Inventor: George H. Klumb et al.

Issued: Feb., 12, 1957

The invention discloses means for treating and purifying water from undesirable constituents contained therein, comprising a receptacle having an access opening and containing a loose mass of treating material and adapted to receive a supply of water within the receptacle and adapted to be freely dispersed through the water to purify the same, a filter for filtering the treated water and retaining in the receptacle the treating material and undesirable constituents and visual indicating means to impart color to the watt being treated when the treating material is partially or wholly exhausted and thereby signal the operator when the quality of the treated water is below a specified standard.

U.S. Pat. No. 4,714,550

Inventor: William S. Malson et al.

Issued: Dec. 22, 1987

A water purifying system includes an elongate chambered purifying assembly sized to be detachable mounted in a conventional canteen. The assembly is provided with an internal chamber filled with a particulate water purifying material and concentric tubes within the chamber require water flowing into the chamber through a filtered inlet at the bottom of the assembly to follow an extended chambered flow path through the purifying material to an outlet at the top of the assembly. The assembly includes a manually operable pump for pressurizing said container, thereby pumping water from the canteen through the purifying assembly.

U.S. Pat. No. 4,800,018

Inventor: Ronald T. Moser

Issued: Jan. 24, 1989

A simplified portable water purification system provides an unfiltered water receiving compartment, a disposable filter cartridge, and a filtered water reservoir all in a single container. The container has a removable lid and is a vertically positioned, wide-mouth, tubular structure. The disposable filter cartridge is horizontally positioned centrally and divides the container into the two compartments. Contaminated and unfiltered water poured into the top receiving compartment of the container gravitates through filtering materials in the disposable filter cartridge. Filtering materials comprising a top macro fabric filter, a core of silver impregnated granular activated carbon, and a bottom micro fabric filter remove contaminants and sediments from the water percolated through the disposable filter cartridge. The taste of the water is improved and possible odors are removed. A spigot is provided low on the container into the filtered water recovery and reservoir compartment for drawing filtered water to use.

U.S. Pat. No. 5,122,272

Inventor: E. Charles Iana

Issued: Jun. 16, 1992

A container assembly for holding a supply of drinking liquid includes a watertight container. A removable filter device extends into the container through an opening at the top. The filter device comprises an elongated cylindrical member having an inner wall divides the area inside of an upper chamber and a lower chamber and forms a sipping tube for accessing the lower chamber through the upper chamber water filter is disposed in the lower chamber. In using the container, air is drawn in through the upper chamber and drinking liquid is drawn out through the sipping straw by suction.

U.S. Pat. No. 5,186,830

Inventor: Joseph M. Rait

Issued: Feb. 16, 1993

Abstract for the drinking water which includes a lower non-porous container to receive the filtrate. An upper vessel closed at its lower end by a high density ceramic filter is stacked in nested relationship to the lower container. When water containing contaminants and pollutants is poured into the filter vessel, it drips through the ceramic filter under gravitational forces and is stored in the lower receptacle.

U.S. Pat. No. 5,431,813

Inventor: Jack E. Daniels

Issued: Jul. 11, 1995

A filtering bottle which includes a water filtering apparatus incorporated within the neck of the bottle. During normal consumption of the water from the water filtering bottle, waiter is filtered by the filtering apparatus to remove unwanted substances in the water such as pesticides, chlorine, particulate matter, algae, bacteria, heavy metals, and improves odor and flavor of the consumable water.

U.S. Pat. No. 5,562,824

Inventor: Jan H. Magnusson

Issued: Oct. 8, 1996

A gravity percolation water purifier assembly. The assembly includes a covered storage container having a dispensing spigot. A flanged filtration chamber is supported beneath the cover to receive untreated water. A porous filter cartridge is sealed to an outlet port. A purifier cartridge is threaded to the outlet port and supports multiple fibrous spacers and treatment chambers containing beds of treatment media, including a multi-valent iodine media, granular activated carbon, and a halogen scavenger media. In one purification cartridge, water passes from multiple inlet ports at an inlet bore through adjoining centric chambers and to the storage container via outlet ports at the periphery of the purifier cartridge.

U.S. Pat. No. 5,609,759

Inventor: John E. Nohren, Jr. et al.

Issued: Mar. 11, 1997

A filter assembly, particularly for use with a plastic bottle having an open neck with an inside diameter of about 50 mm or less (e.g. about 25 mm), includes a tube of filtering material connected to one surface of a cap while a valve extends from an opposite surface of the cap. The tube is preferably of filtering material such as activated carbon with plastic binder, having a substantially continuous liquid-porous sidewall, a hollow interior, a first closed end, and a second open end. The tube is operatively connected to the cap second surface at the tube second open end by sonic welding, a mechanical connection, or adhesively. The cap has a fitting portion for cooperating with the bottle neck, such as internal screw threads or a snap portion. The valve may be a reciprocating valve, a baby bottle nipple, or a spray device. A biocidal medium may be disposed within the hollow interior of the filter tube, and the tube may be wrapped with a filter material having a pore size of about 14 microns. The filtering material is capable of reducing the level of chlorine and water passing through it by at least 50% at a flow rate of about 5 ml/second.

U.S. Pat. No. 5,733,448

Inventor: Kamaljit S. Kaura

Issued: Mar. 31, 1998

Two chambers in a container are separated by an easily replaced filter. One of the chambers is capable of being compressed so as to pressurize a water volume in the chamber which is to be filtered. The water is therefore forced through the filter into the second of the chambers where it is stored for use in a clean and drinkable form. The filter is made-up of a series of discs arranged to effectively remove particulate, chemical and other undesired contents of the water. The filtered water may be filtered to the molecular level providing an essentially sterile drinking water. The filter may also remove odor and taste components that are undesirable. The filter is constructed and held within the container in such a manner as to prevent seepage and leakage of the unfiltered water.

U.S. Pat. No. 5,830,360

Inventor: B. Robert Mozayeni

Issued: Nov. 3, 1998

A gravity-fed, pour-through water filtration device includes a chamber housing a spiral filter including a biocidal material and an annular holding chamber. Several porous separator disks, a volume of filtration media, and a cyst membrane are positioned beneath the spiral filter and holding chamber. The device is effective in significantly reducing the number of bacteria, viruses and cysts present in the filtrated water.

U.S. Pat. No. 6,344,146

Inventor: John S. Moorehead

Issued: Feb. 5, 2002

A portable, self-contained, fully integrated water purification device which includes a receptacle modified to accommodate a filtration assembly for purifying water, and to store water following purification. The receptacle provides separate openings for water intake, and water outflow. The filtration assembly includes a pump and a multistage filter cartridge. Pump action draws water into the water purification device and forces the water though the multistage filter and into the receptacle. Purified water may be stored in the receptacle until consumption.

While these filtering bottles may be suitable for the purposes for which they were designed, they would not be as suitable for the purposes of the present invention, as hereinafter described.

SUMMARY OF THE PRESENT INVENTION

The present invention discloses a personal water purification system providing a watertight polymeric container having a removable, threaded unfiltered water fill cap that provides access through an inlet port to an upper unfiltered water receiving chamber. At the lowest integral portion of the receiving chamber, a threaded port is provided for the attachment of a disposable filter cartridge that is vertically threaded into the port. This allows for gravity induced filtering through the cartridge as opposed to pressure induced filtering. A plurality of filtered water ports are also located in the lower integral portion of the unfiltered water chamber which allow filtered water to be dispensed through a plurality of channels/conducts from the lower filtered water chamber to a drinking spout provided at the top most portion of the container and to flow by gravity when the container is tipped to its side.

A primary object of the present invention is to provide a portable filtering bottle.

Another object of the present invention is to provide a portable filtering bottle functioning as a personal water purification system.

Yet another object of the present invention is to provide a portable filtering bottle that can be used anywhere to provide the user with filtered water.

Still yet another object of the present invention is to provide a portable filtering bottle that will save the user from buying bottled water.

Another object of the present invention is to provide a portable filtering bottle having a first chamber and a second chamber and a filtering material therebetween.

Yet another object of the present invention is to provide a portable filtering bottle having a first spout for pouring water into the first chamber.

Still yet another object of the present invention is to provide a portable filtering bottle having a second spout for removing filtered water from the second chamber.

Another object of the present invention is to provide a portable filtering bottle having the first chamber positioned over the second chamber whereby the filtration method is gravity fed.

Yet another object of the present invention is to provide a portable filtering bottle whereby said first chamber can be separated from said second chamber for the replacement of the filtering material.

Still yet another object of the present invention is to provide a portable filtering bottle comprising a housing having a top member and a bottom member.

Another object of the present invention is to provide a portable filtering bottle wherein said top member incorporates at least one conduit whereby said filtered water can be moved from said second chamber to said second spout.

Yet another object of the present invention is to provide a portable filtering bottle wherein said first spout is recessed into the wall of the top member.

Additional objects of the present invention will appear as the description proceeds.

The present invention overcomes the shortcomings of the prior art by providing a personal water filtering system comprising a portable bottle having a top member and a bottom member threadedly connected having a filtering material positioned therebetween. Said top member having a first and second spout. Said first spout provides means for pouring water into a first chamber which provides means for said water to gravitational pass into the second chamber through said filtering material. The water in the second chamber is in fluid communication with the second spout by means of at least one conduit contained within the top member connecting said second chamber to said second spout. The filtering material can be periodically replaced by separating the two member which provides access to the filtering material.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

List of Reference Numerals

With regard to reference numerals used, the following numbering is used throughout the drawings.

10 present invention
12 container
14 filtered water cap
16 lower filtered water chamber
18 unfiltered water cap
20 upper unfiltered water chamber
22 pop up spout
24 lower portion of chamber
26 disposable filter cartridge
28 inlet port
30 threaded port for cartridge
32 filtered water port
34 water channel
36 unfiltered fluid
38 filtered fluid

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
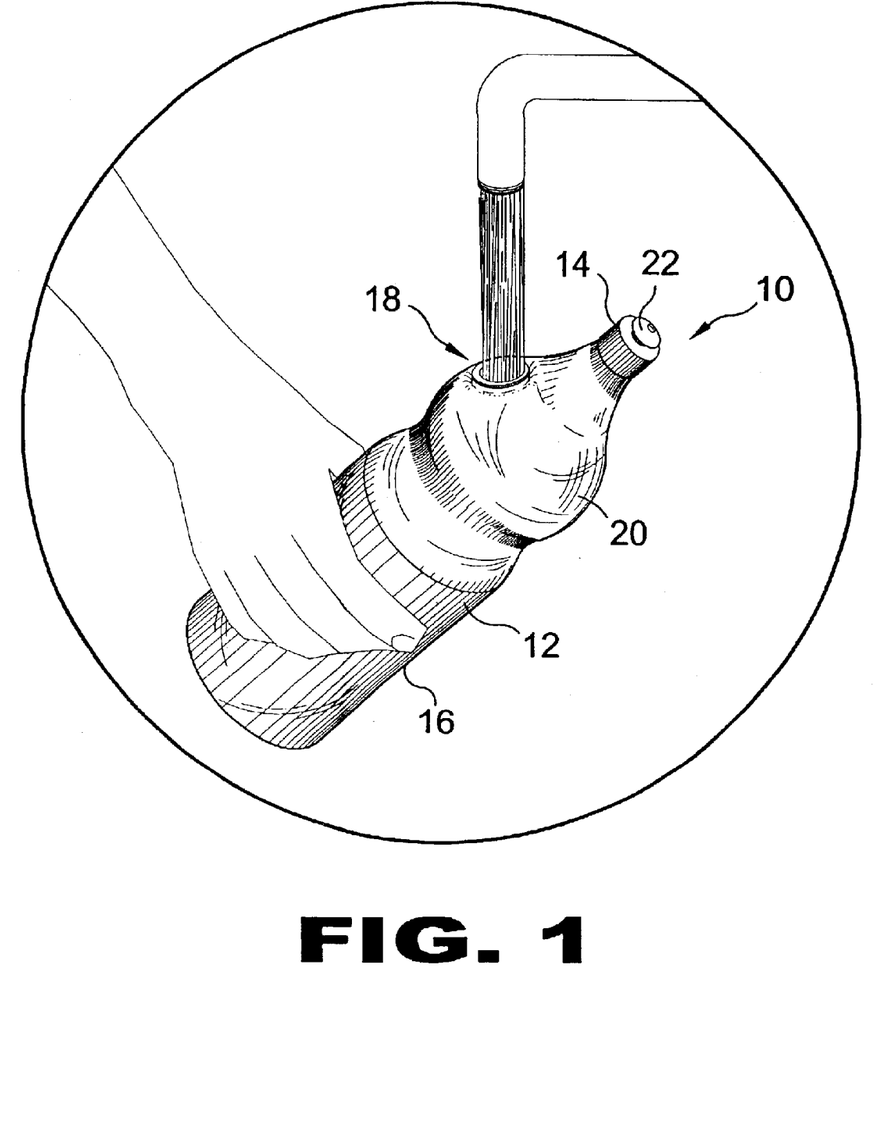
FIG. 1 is an illustrative view of the present invention in use.

Turning to FIG. 1, shown therein is an illustrative view of the present invention 10 in use. The present invention 10, a personal water purification system, provides a watertight polymeric container 12 having a removable, threaded inlet fill cap 18 that provides access to an unfiltered upper water receiving chamber 20. At the lowest integral portion of the receiving camber 20, a threaded port is provided for the attachment of a disposable filter cartridge that is vertically threaded into the port. This allows for gravity induced filtering as opposed to pressure induced filtering. A plurality of filtered water ports are also located in the lower integral portion of the unfiltered water chamber, one or more opposite the other and/or juxtapositioned, which allow filtered water to be dispensed by gravity through a plurality of ports from the lower filtered water chamber 16 to a drinking spout 22 on disposed on the cap base 14 of the cap provided at the top most portion of the container when the container 12 is tipped to its side.

Figure 2:
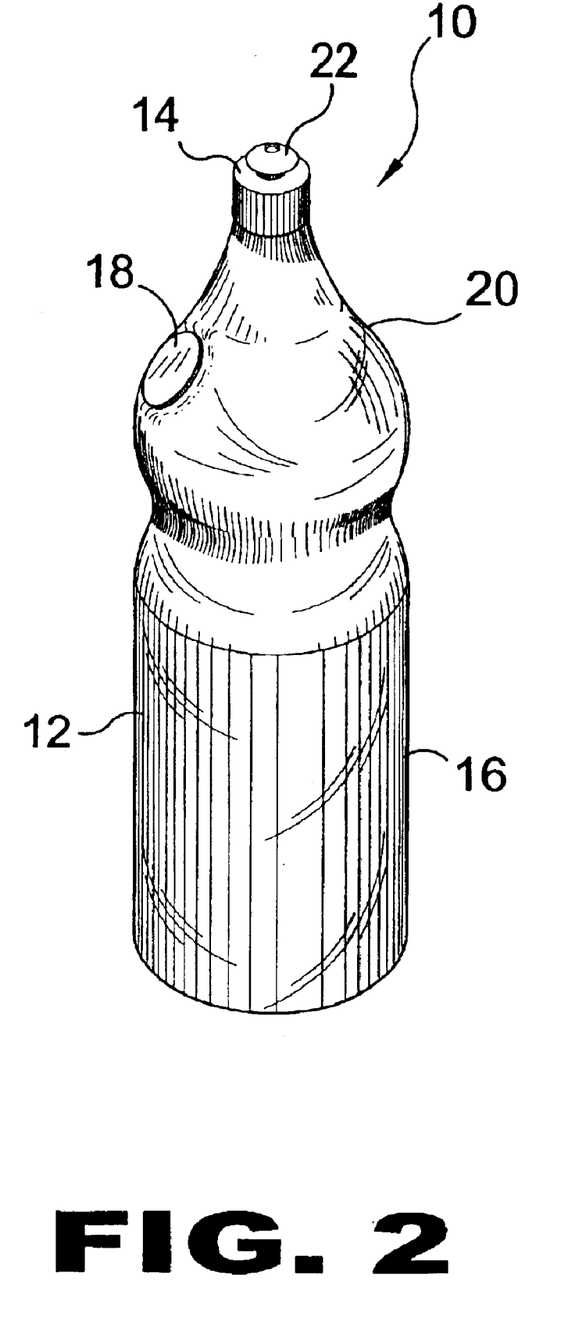
FIG. 2 is a perspective view of the present invention.

Turning to FIG. 2, shown therein is a perspective view of the present invention 10. Shown is the present invention 10, a personal water purification system, providing a watertight polymeric container 12 having a removable, threaded unfiltered water inlet fill cap 18 that provides access to an upper unfiltered water receiving chamber 20. Also shown is a lower filtered water chamber 16. Also shown is a pop-up drinking spout 22 on top 14 that allows fluids to be dispensed when in an up position as would be done in the standard manner by one skilled in the art and confines the fluid to the interior of the container 12 when in the down or closed position.

Figure 3:
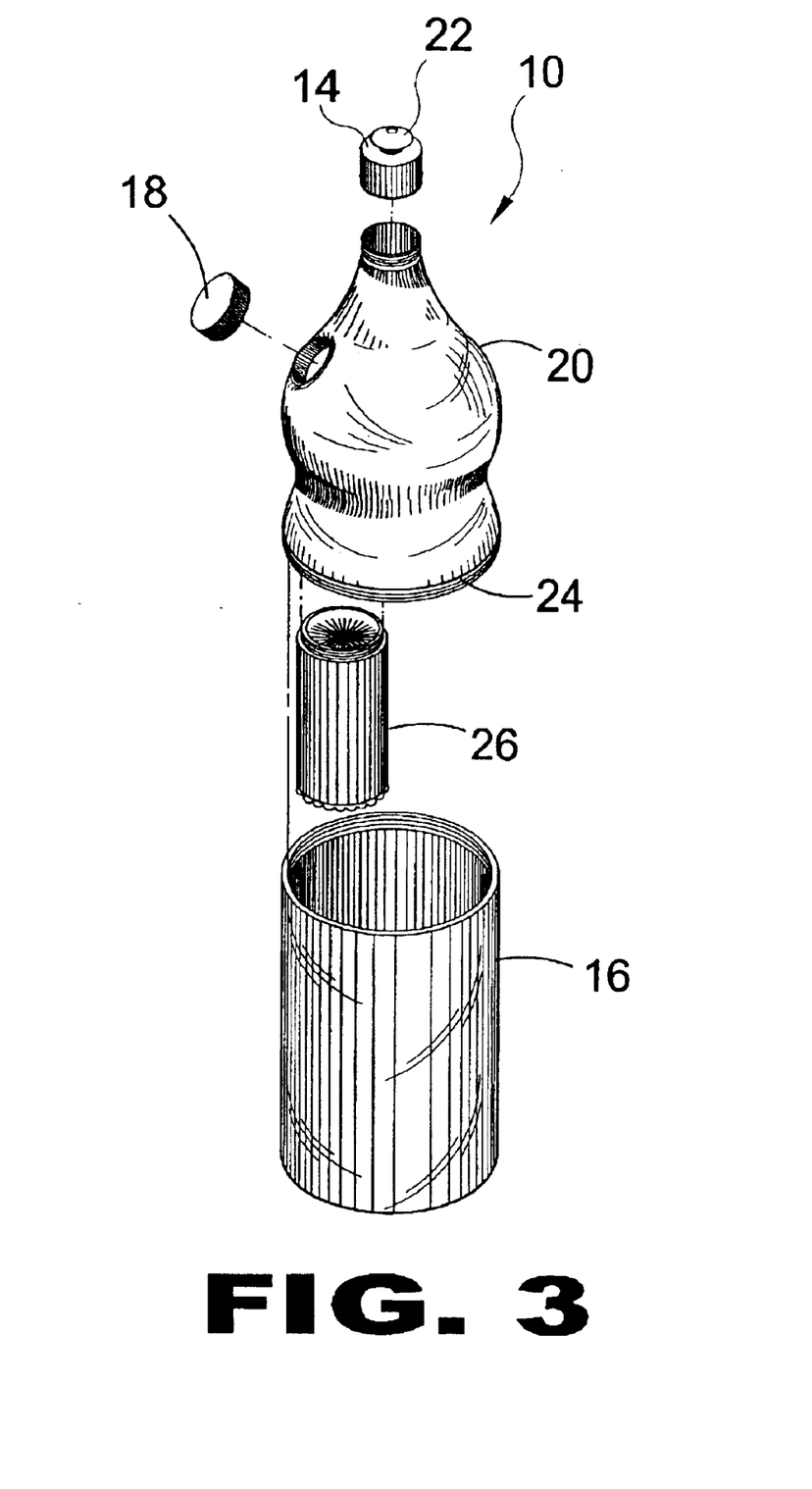
FIG. 3 is an exploded view of the present invention.

Turning to FIG. 3, shown therein is an exploded view of the present invention 10. Shown is an exploded view of the present invention 10, a personal water purification system, which provides a watertight polymeric container having a removable, threaded fill cap 18 that provides access to an unfiltered water receiving chamber 20. At the lowest integral portion 24 of the receiving chamber 20, a threaded port is provided for the attachment of a disposable filter cartridge 26 that is vertically threaded into the port. This allows for gravity induced filtering as opposed to pressure filtering. A plurality of filtered water ports are also located in the lower integral portion 24 of the unfiltered water chamber 20, one or more opposite the other and/or juxtapositioned to allow filtered water to be dispensed through a plurality of ports from the filtered water chamber 16 to a drinking spout 22 on top 14 provided at the top most portion of the container by gravity when the container is tipped to its side.

Figure 4:
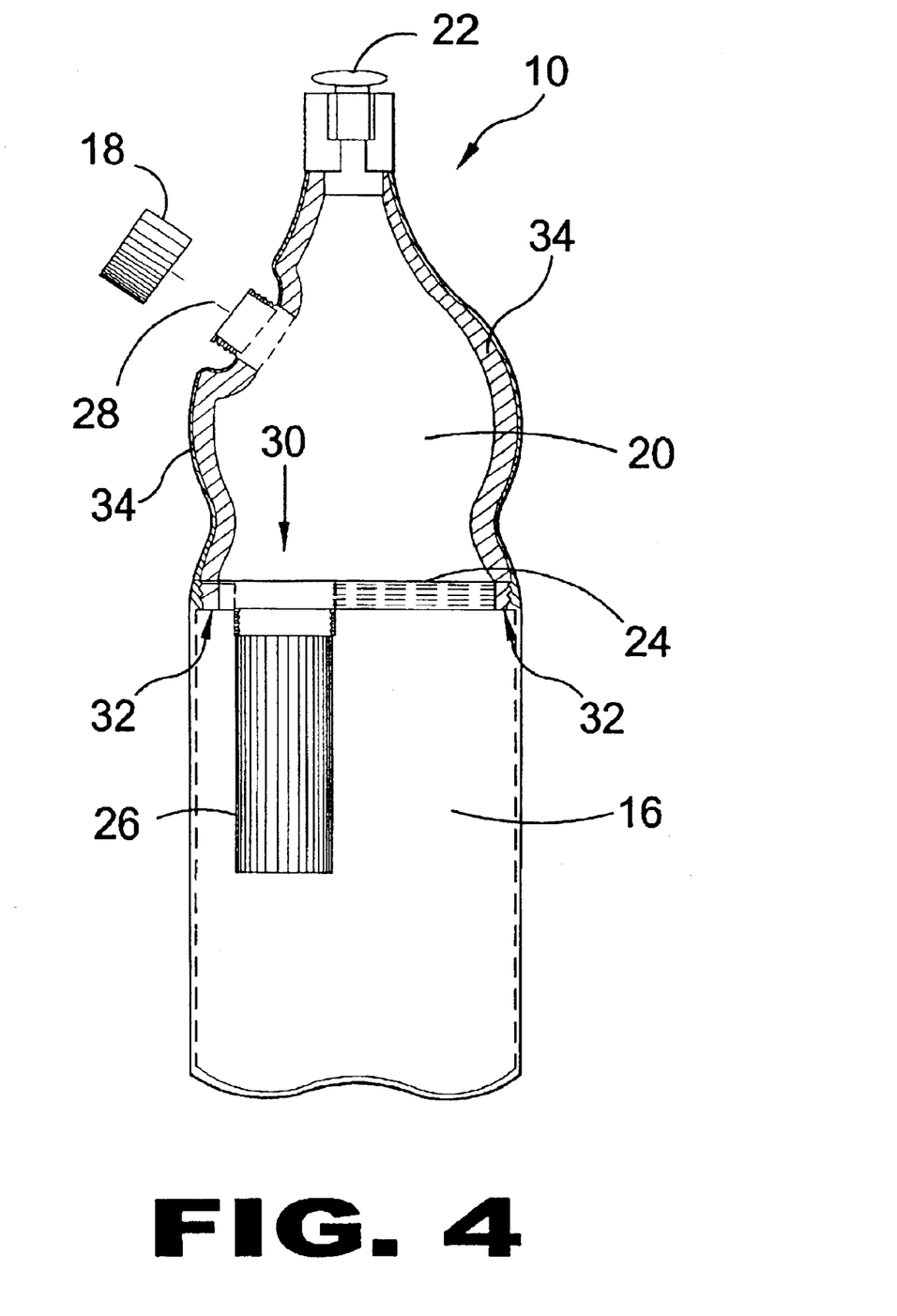
FIG. 4 is a sectional view of the present invention.

Turning to FIG. 4, shown therein is a sectional view of the present invention 10. Shown is a sectional view of the present invention 10, a personal water purification system providing a watertight polymeric container having a removable, threaded unfiltered water fill cap 18 that provides access through port 28 to an upper unfiltered water receiving chamber 20. At the lowest integral portion 24 of the receiving chamber 20, a threaded port 30 is provided for the attachment of a disposable filter cartridge 26 that is vertically threaded into the port 30. This allows for gravity induced filtering through cartridge 26 as opposed to pressure induced filtering. A plurality of filtered water ports 32 are also located in the lower integral portion 24 of the unfiltered water chamber 20, one or more opposite the other and/or juxtapositioned, which allow filtered water to be dispensed through a plurality of channels/conducts 34 from the lower filtered water chamber 16 to a drinking spout 22 provided at the top most portion of the container and to flow by gravity when the container is tipped to its side.

Figure 5:
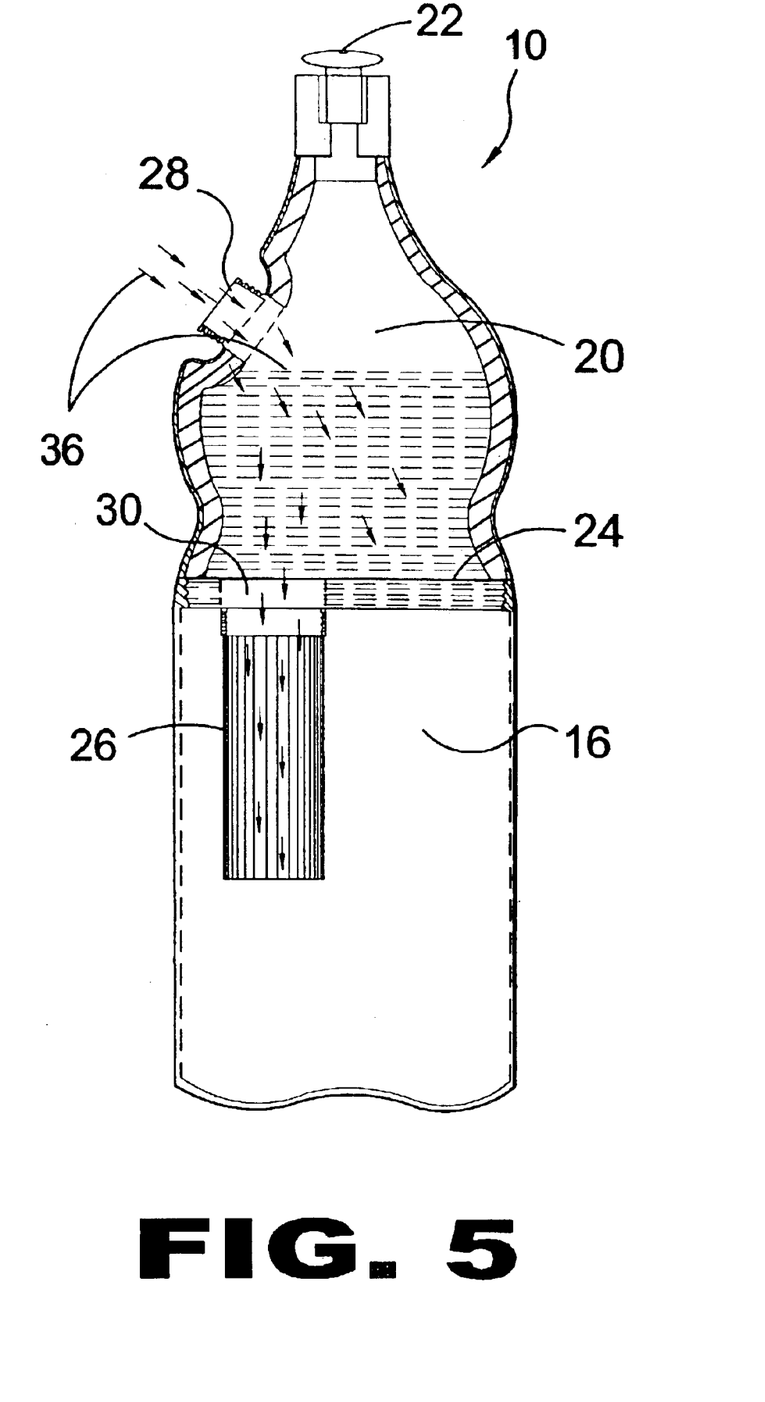
FIG. 5 is a sectional view of the present invention.

Turning to FIG. 5, shown therein is a sectional view of the present invention 10. Shown is a sectional view of the present invention 10, a personal water purification system, providing a watertight polymeric container having a removable, threaded inlet fill cap port 28 that provides access to an upper unfiltered water receiving chamber 20, shown filled with unfiltered fluid 36. At the lowest integral portion 24 of the receiving chamber 20, a threaded port 30 is provided for the attachment of a disposable filter cartridge 26 that is vertically threaded into the port 30. A plurality of filtered water ports are also located in the lower integral portion of the unfiltered water chamber 20, one or more opposite the other, and allow filtered water to be dispensed from the lower filtered water chamber 16 to a drinking spout 22 provided at the top most portion of the container and to flow by gravity when the container is tipped to its side.

Figure 6:
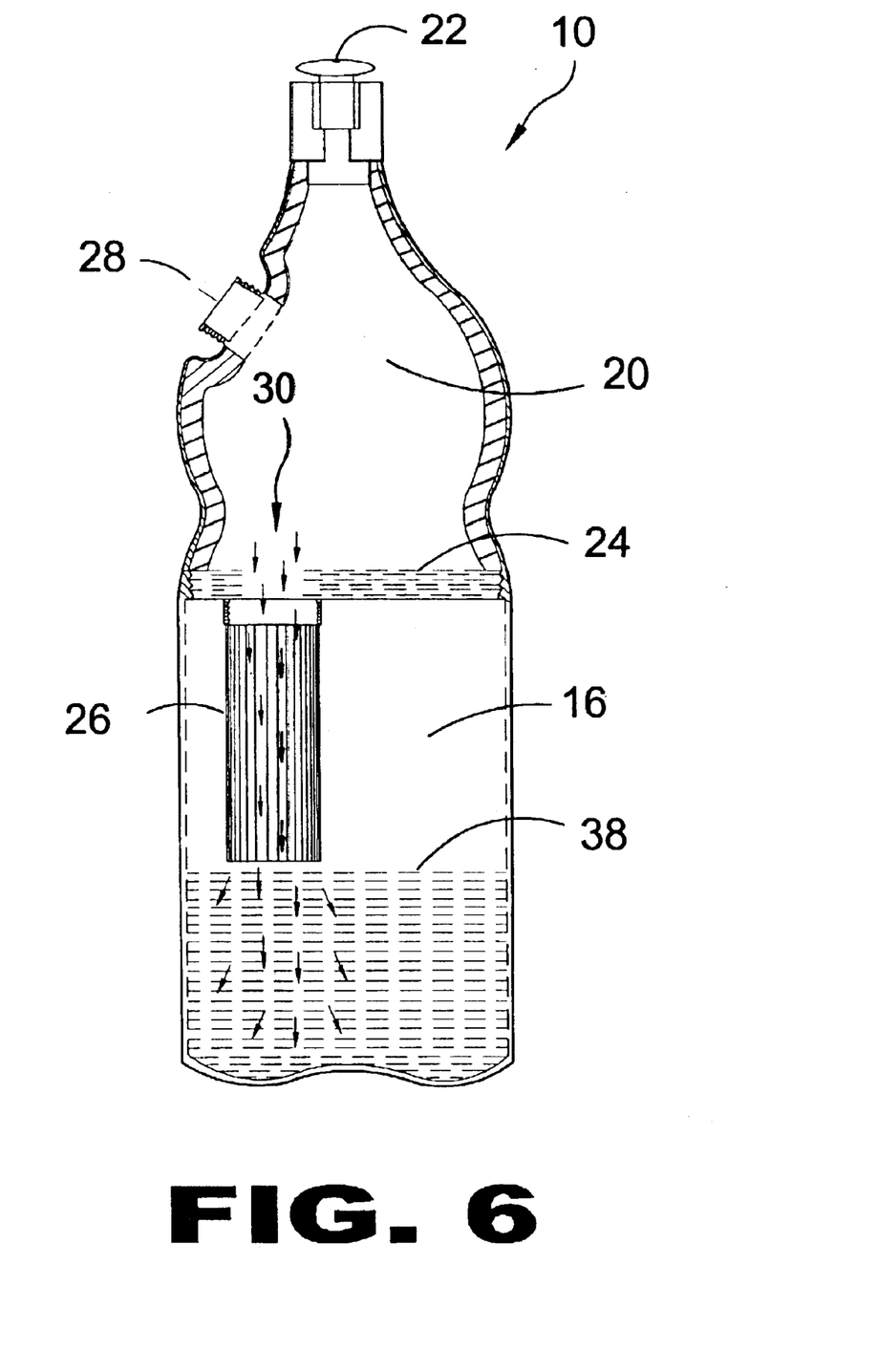
FIG. 6 is a sectional view of the present invention.

Turning to FIG. 6, shown therein is a sectional view of the sent invention 10. Shown is the present invention 10, with filtered fluids 38 within the lower filtered water chamber 16 after filtering from an upper unfiltered water chamber 20 through a disposable filter cartridge 26 that is vertically threaded into a port 30. A plurality of filtered water ports are located in the lower integral portion 24 of the unfiltered water chamber 20, one or more opposite the other, which allow filtered water to be dispensed from the filtered water chamber to a drinking spout 22 provided at the top most portion of the container by gravity when the container is tipped to its side. The unfiltered water fill port 28 is also shown.

Figure 7:
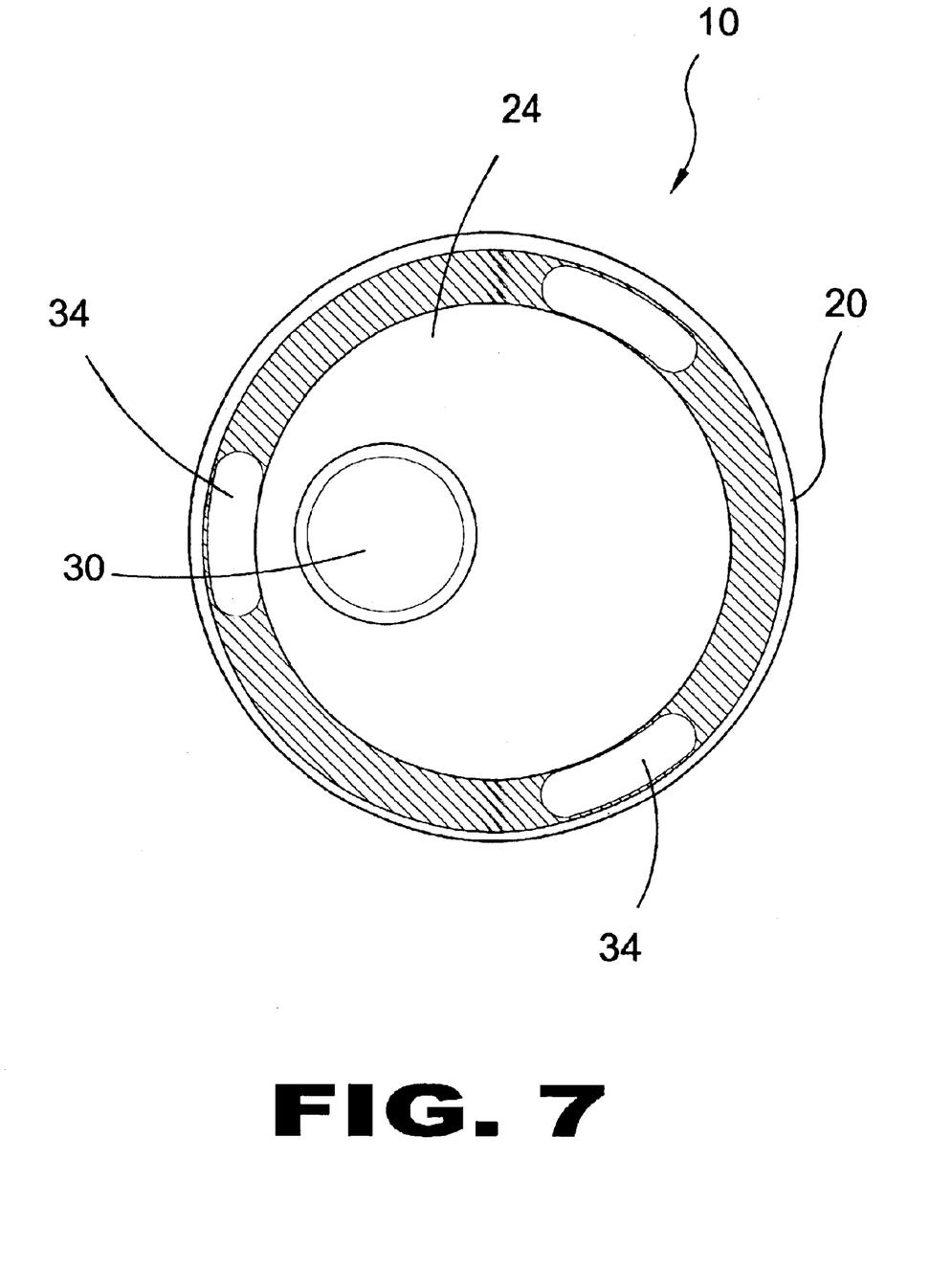
FIG. 7 is a cross sectional view of the present invention.

Turning to FIG. 7, shown therein is a cross sectional view of the present invention 10. Shown is a cross sectional view of the lower portion 24 of the unfiltered chamber 20 having a filter port 30 to receive a mating filter cartridge and one or more filtered water channels 34 which allows filtered water to flow from the lower filtered water chamber to the drinking spout located on top of the container.

Figure 8:
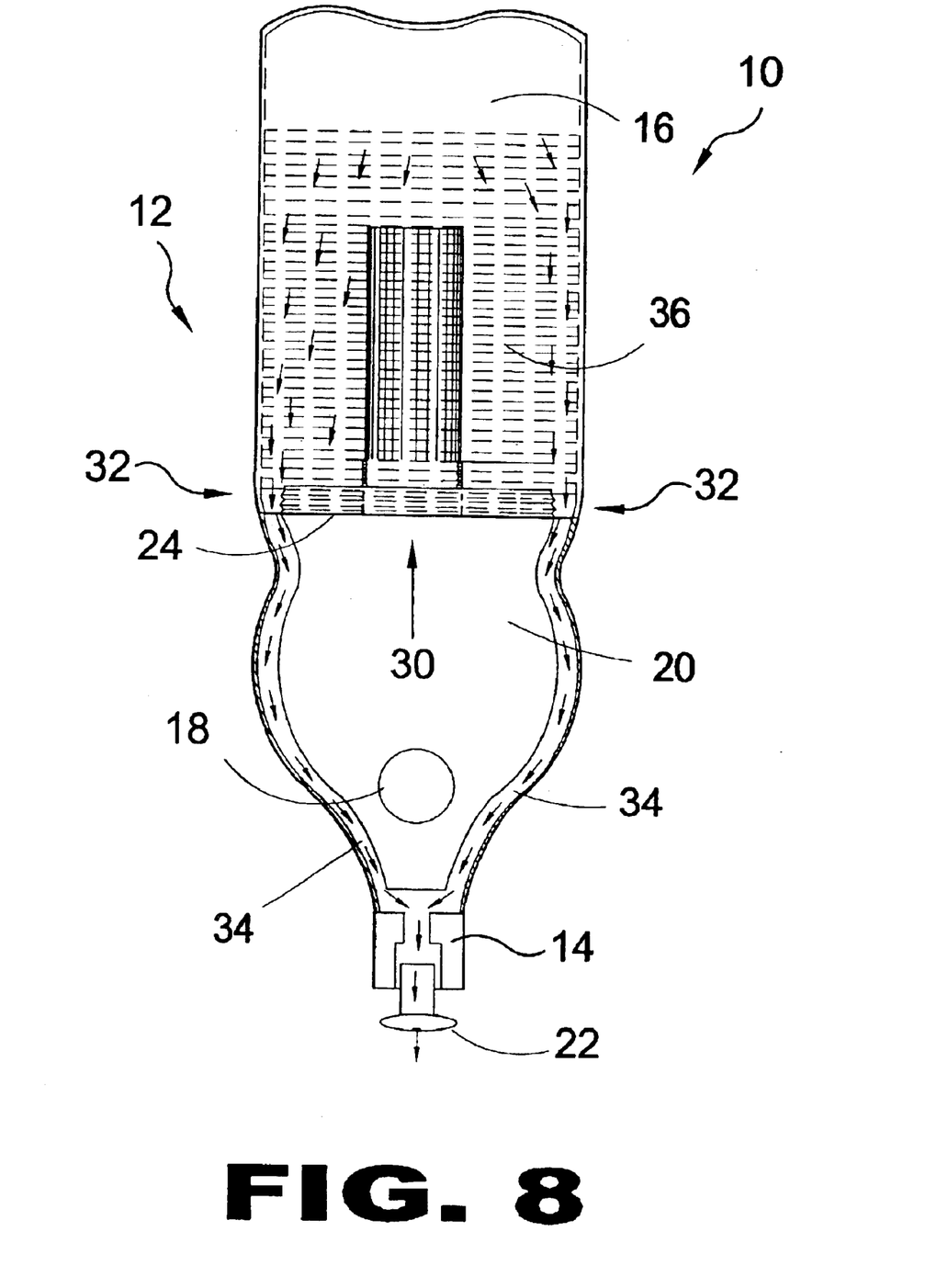
FIG. 8 is a sectional view of the present invention.

Turning to FIG. 8, shown therein is a sectional view of the present invention 10. The present invention 10, a personal water purification system, provides a watertight polymeric container 12 having a removable, threaded fill cap 18 that provides access to an unfiltered water receiving chamber 20. At the lowest integral portion 24 of the receiving chamber 20, a threaded port 30 is provided for the attachment of a disposable filter cartridge 26 that is vertically threaded into the port 30. A plurality of filtered water ports 32 are also located in the lower integral portion 24 of the unfiltered water chamber 20, one or more opposite the other, which allow filtered water to be dispensed through water channels 34 from the filtered water chamber 16 to a drinking spout 22 provided at the top most portion of the container 12 and to allow flow by gravity when the container 12 is tipped to its side or turned upside down. Conduit 34 extends through the walls of the upper chamber 20 and mates with conduit through the cap base 14 and the pop up drinking spout 22.

I claim:

1. An apparatus for providing a self-contained personal water purification system for a user comprising:
    a) a container for holding water, said container having an upper chamber for containing unfiltered water and a lower chamber for containing filtered water;
    b) said upper chamber having atop end and a lower end, wherein said lower end forms a bottom having a port therein, wherein said port receives a mating filter cartridge, wherein said upper chamber has a wall, said wall having a first inlet therein for receiving unfiltered water and at least one conduit therein through which filtered water can flow, wherein said at least one conduit has a second inlet port therein, wherein said second inlet port is disposed in said bottom of said upper chamber;
    c) said lower chamber having a top end and a lower end, said top end being open and said lower end being closed;
    d) a water filter cartridge removably disposed on said port disposed in said bottom of said upper chamber to permit water to be filtered as the water flows by gravity downwardly through the filter cartridge to the lower chamber;
    e) means for connecting said top end of said lower chamber to said lower end of said upper chamber whereby said upper and lower chambers are removably attached to each other; and, f) a drinking spout disposed on said top end of said upper chamber whereby filtered water from the lower chamber can be resealably delivered to a user by passing through the conduit in the wall of the upper chamber.

2. The apparatus of claim 1, wherein said filter cartridge is cylindrically shaped having a first end and a second end.

3. The apparatus of claim 2, wherein said first end of said filter cartridge has a first set of threads thereon, wherein said port disposed in said bottom of said upper chamber has a second set of threads thereon, wherein said first and second set of threads are complimentarily sized to permit the filter cartridge to be removably disposed in the port disposed on the bottom of the upper chamber.

4. The apparatus of claim 3, wherein said filter cartridge is disposable to permit easy replacement of the filter cartridges.

5. The apparatus of claim 4, wherein said first inlet in said wall of said upper chamber is threaded to receive a mating threaded cap.

6. The apparatus of claim 5, further comprising a cap disposed on said first inlet in said wall, wherein said cap has threads thereon to permit removable attachment to the first inlet in the wall of the upper chamber to permit unfiltered water the placed in the upper chamber.

7. The apparatus of claim 6, wherein said means for connecting said top end of said lower chamber to said lower end of said upper chamber comprises:

a) a first set of threads disposed on said top end of said lower chamber;

b) a second set of threads disposed on said lower end of said upper chamber; and, c) wherein said first and second set of threads are complimentarily sized to permit removable connection of the upper and lower chambers.

8. The apparatus of claim 7, wherein said drinking spout comprises:

a) a base member disposed on said top end of said upper chamber, said base member having a first end and a second end, wherein said second end is oriented toward said top end of said upper chamber, said base member having a conduit therein, said conduit extending from said first end to said second end of said base member;

b) wherein said conduit in said base member mates to said conduit in said wall of said upper chamber to permit filtered water to pass therethrough; and, c) a pop-up spout disposed on said first end of said base member, wherein said pop-up spout is closed in a first position and open in a second position to permit water to flow therethrough when in the open second position and thereby be delivered to a user.

9. The apparatus of claim 8, wherein there are a plurality of conduits disposed in said wall of said upper chamber to permit filtered water to pass therethrough.

10. The apparatus of claim 9, wherein there are three conduits disposed in said wall of said upper chamber to permit filtered water to pass therethrough.

* * * * *